United States Patent [19]

Nass et al.

[11] Patent Number: 5,593,781
[45] Date of Patent: Jan. 14, 1997

[54] METHOD OF MANUFACTURING SURFACE-MODIFIED CERAMIC POWDERS WITH PARTICLES IN THE NANOMETER SIZE

[75] Inventors: Rüdiger Nass, Riegelsberg; Helmut Schmidt, Saarbrükken-Güdingen; Peter Schmitt, Heusweiler, all of Germany

[73] Assignee: Institut Fue Neue Materialien Gemeinnützige GMBH, Saarbrücken, Germany

[21] Appl. No.: 295,788

[22] PCT Filed: Apr. 8, 1993

[86] PCT No.: PCT/EP93/00871

§ 371 Date: Nov. 3, 1994

§ 102(e) Date: Nov. 3, 1994

[87] PCT Pub. No.: WO93/21127

PCT Pub. Date: Oct. 28, 1993

[30] Foreign Application Priority Data

Apr. 15, 1992 [DE] Germany .................. 42 12 633.9

[51] Int. Cl.$^6$ .................. B32B 5/16; B05D 7/00
[52] U.S. Cl. .................. 428/403; 427/220; 427/372.2; 428/593; 428/600; 501/12; 501/153
[58] Field of Search .................. 427/220, 372.2; 423/593, 600; 501/12, 153; 428/403

[56] References Cited

U.S. PATENT DOCUMENTS 3,945,945  3/1976  Kiovsky ........................ 423/626
4,744,802  5/1988  Schwabel ...................... 51/309

*Primary Examiner*—Shrive Beck
*Assistant Examiner*—David M. Maiorana
*Attorney, Agent, or Firm*—Oblon, Spivak, McClelland, Maier & Neustadt, P.C.

[57] ABSTRACT

In the method described, the degree of agglomeration of the nanometer-size particles can be readily checked, thus enabling dispersions of particles of this kind to be produced with high solids contents. The method calls for the unmodified powder to be dispersed in water and/or an organic solvent in the presence of a low-molecular organic compound including a functional group which can react and/or interact with groups present on the surface of the powder particles. The dispersant may subsequently be wholly or partly removed.

26 Claims, No Drawings

METHOD OF MANUFACTURING SURFACE-MODIFIED CERAMIC POWDERS WITH PARTICLES IN THE NANOMETER SIZE

The present invention relates to a method of manufacturing surface-modified ceramic powders in the nanometer size range. Particularly, the present invention relates to a method of the mentioned type by means of which the state of agglomeration of particles in the nanometer size range in a suspension can be controlled and which can thus be employed for producing suspensions and compositions, respectively with high solids contents.

In the following "particles in the nanometer size range" and "powders in the nanometer size range", respectively is to denote particles and powders, respectively, wherein the average particle size is not higher than 100 nm, particularly not higher than 50 nm, and particularly preferred not higher than 30 nm.

In the processing of nanodisperse materials (particles, powders) substantially two problems are encountered, i.e.:
(a) control of the agglomeration of particles in the processing of said materials, and
(b) the production of processable ceramic compositions having high solids contents.

Regarding problem (a) it is to be noted that when going from ceramic powders in the submicron size range to ceramic powders in the nanometer size range, an increase of agglomeration is generally observed. This is due to the fact that as the particle size decreases, weak forces of interaction such as van der Waals forces also gain significant importance and dominate, respectively. Further, the particle surface is always occupied by functional groups, i.e., groups capable of undergoing condensation. With conventional powders in the submicron size range, said groups are of importance only insofar as they can be used as centers of interaction for necessary organic processing aids (dispersion aids, binders, etc.). However, due to the high surface to volume ratio in nanodisperse materials, the surface groups are of importance also in another respect. On the one hand, they can also serve as reaction centers for organic processing aids. On the other hand, however, they can also result in the formation of hard agglomerates due to condensation reactions between individual particles. The particles are connected to each other quasi by "sinternecks". Thus, it is desirable to develop methods by means of which said agglomeration can be controlled to such an extent that agglomerated powders can be obtained in a controlled manner. Further it would be beneficial if by said method the reactive surface could be shielded outwardly and thereby a condensation between the particles could be prevented.

Regarding the above problem (b) it can be noted that the production of ceramic compositions having high solids contents and properties adapted for being suitable for a molding process is quite difficult. In oder to avoid agglomerates which can result in severe defects both in green and in sintered bodies, suspensions are generally employed. For stabilizing the suspensions, dispersion aids are added which are to prevent an agglomeration and to impart the required processing properties to said suspension. On principle, there are two different ways of stabilizing a suspension, i.e., the electrostatic and the steric stabilization. The electrostatic stabilization is disadvantageous in that due to the high hydrodynamic radius of the suspended particles, only low solids contents may be realized. In contrast thereto, the steric stabilization on principle allows the production of suspensions having high solids contents from materials in the nanometer size range since in this case the hydrodynamic particle radius is much smaller.

The advantages of the steric stabilization have already been demonstrated with nanodisperse $SiO_2$ as example. As dispersion aids, non-ionic organic polymers (e.g. polymethyl methacrylate) which are adsorbed on the particle surface were generally employed in said case. The disadvantage of such a stabilization is that even thereby only maximum solids contents of 20 to 30% by volume may be realized and that the applicability of said stabilization to systems different from $SiO_2$ is possible only with significant limitations. The reason therefor mainly is that the surface-chemical properties which are characteristic for a certain material (e.g. acidic/basic properties) cannot be taken into account.

Thus it is also desirable to provide a method which makes it possible to modify the particle surface by corresponding chemical compounds in such a manner that the particles are shielded against condensation reactions between particles so that an optimum degree of dispersion may be achieved and high solids contents of the dispersion may be realized.

Thus, the problem underlying the present invention is to provide a method by which the problems (a) and (b) discussed above may be solved.

According to the present invention, said problem is solved by a method of manufacturing surface-modified ceramic powders in the nanometer size range which is characterized in that the unmodified powder is dispersed, in the presence of at least one low molecular weight organic compound having at least one functional group capable of reacting and/or interacting with the surface groups of the powder particles, in water and/or an organic solvent and subsequently the dispersant is optionally removed wholly or partly.

As unmodified ceramic materials (dense particles in the nanometer size range) which may be employed in the method according to present invention, (mixed) metal oxides such as (optionally hydrated) $Al_2O_3$, partly or completely stabilized $ZrO_2$, mullite, cordierite, perowskites, e.g. $BaTiO_3$, PZT, PLZT, etc., are particularly suitable. Examples of other suitable starting materials are non-oxides such as carbides, nitrides, borides and carbonitrides. Specific examples therefor are SiC, $Si_3N_4$, $B_4C$, BN, $TiB_2$, TiN, TiC and Ti(C,N). Mixtures of oxides and mixtures of non-oxides, respectively and mixtures of oxides and non-oxides may, of course, also be employed.

A ceramic starting material which is particularly preferred according to the present invention is boehmite (γ-AlO(OH)).

As surface modifier, i.e. as surface modifying low molecular weight organic (=carbon-containing) compound having at least (and preferably) one functional group capable of reacting and/or (at least) interacting with groups present on the surface of the powder particles, compounds having a molecular weight not higher than 500, preferably not higher than 350 and particularly not higher than 200, are particularly suitable. Such compounds are preferably liquid under normal conditions and soluble or at least emulsifiable in the dispersion medium.

Such compounds preferably have not more than a total of 15, particularly not more than a total of 10, and particularly preferred not more than 8 carbon atoms. The functional groups which said compounds have to carry are mainly determined by the surface groups of the ceramic starting materials employed in a specific case and, moreover, also by the desired interaction. It is particularly preferred that an acid/base-reaction according to Bronsted or Lewis (including complex formation and adduct formation) can take place between the functional groups of the surface modifying compound and the surface groups of the ceramic particles. An example of another suitable interaction is the dipole-dipole interaction.

Examples of preferred functional groups thus are carboxylic acid groups, (primary, secondary and tertiary) amino groups and C-H-acidic groupings. Several of said groups may also be present in one molecule at the same time (betaines, amino acids, EDTA, etc.).

Accordingly, examples of particularly preferred surface modifiers are saturated or unsaturated mono- and polycarboxylic acids (preferably monocarboxylic acids) having 1 to 12 carbon atoms (e.g. formic acid, acetic acid, propionic acid, butyric acid, pentanoic acid, hexanoic acid, acrylic acid, methacrylic acid, crotonic acid, citric acid, adipic acid, succinic acid, glutaric acid, oxalic acid, maleic acid and fumaric acid). A particularly preferred monocarboxylic acid is propionic acid. The unsaturated carboxylic acids additionally offer the possibility to carry out a crosslinking by means of the ethylenically unsaturated double bond.

Examples of further suitable surface modifiers are mono- and polyamines, particularly those of the general formula $R_{3-n}NH_n$, wherein n=0, 1 or 2 and the radicals R independently are alkyl groups having 1 to 12, particularly 1 to 6 and particularly preferred 1 to 4 carbon atoms (e.g. methyl, ethyl, n-and i-propyl and butyl) and ethylene polyamines (e.g. ethylene diamine, diethylene triamine, etc.); β-dicarbonyl compounds having 4 to 12, particularly 5 to 8 carbon atoms, such as acetylacetone, 2,4-hexanedione, 3,5-heptanedione, acetoacetic acid and $C_1$-$C_4$-alkyl esters of acetoacetic acid; organo-alkoxysilanes, e.g. those which are employed for the surface modification of colloidal silica (e.g. those of the general formula $R_{4-m}Si(OR')_m$, wherein the groups R and R' independently represent $C_1$-$C_4$-alkyl and m is 1, 2, 3 or 4); and modified alcoholates, wherein part of the OR groups (R being defined as above) is replaced by inert organic groups and a bonding (condensation) to the particle surface takes place via the OR groups still present and the organic groups take care of the shielding. Examples therefor are, e.g., alcoholates of zirconium and titanium, $M(OR)_4$ (M=Ti, Zr), wherein a part of the OR groups is replaced by a complexing agent such as a S-dicarbonyl compound or a (mono) carboxylic acid. If an ethylenically unsaturated compound (such as methacrylic acid) is employed as complexing agent, crosslinking can take place in addition thereto (see above).

As dispersion media, water and/or organic solvents are preferably employed. A particularly preferred dispersion medium is distilled (pure) water. As organic solvent, both polar and non-polar and aprotic solvents are suitable. Examples thereof are alcohols, such as aliphatic alcohols having 1 to 6 carbon atoms (particularly methanol, ethanol, n- and i-propanol and butanol); ketones, such as acetone and butanone; esters, such as ethylacetate; ethers, such as diethylether, tetrahydrofuran and tetrahydropyran; amides, such as dimethylacetamide and dimethylformamide; sulfoxides and sulfones, such as sulfolane and dimethylsulfoxide; and aliphatic (optionally halogenated) hydrocarbons, such as pentane, hexane and cyclohexane. Mixtures of such solvents may, of course, also be employed.

The dispersion medium employed preferably has a boiling point which allows an easy removal thereof by distillation (optionally under vacuum). Solvents having a boiling point below 200° C., particularly below 150° C., are preferred.

In the practice of the present process, the concentration of the dispersion medium generally is 40 to 90, preferably 50 to 80 and particularly 55 to 75% by weight. The remainder of the dispersion is composed of starting powder and low molecular weight organic compound (surface modifier). Here, the weight ratio ceramic powder/surface modifier generally ranges from 100:1 to 4:1, particularly from 50:1 to 8:1, and particularly preferred from 25:1 to 10:1.

The method according to the present invention is preferably carried out at a temperature of from room temperature (about 20° C.) up to the boiling temperature of the dispersion medium. Particularly preferred are dispersion temperatures in the range of from 50° to 100° C.

The dispersion time depends particularly on the types of the materials employed but in general ranges from several minutes to several hours, e.g. from 1 to 24 hours.

Upon completion of the surface modification, the dispersion (suspension) obtained may either be further processed as such (see below) or the dispersion medium may be removed wholly or partly (e.g. up to a desired solids concentration). A particularly preferred method for removing the dispersion medium (particularly when the dispersion medium comprises water) is lyophilization.

The suspension and the dry, surface-modified ceramic powder in the nanometer size range, respectively can then be further processed in order to produce green bodies and sintered bodies, respectively. A particularly preferred further processing is the production of compositions for extrusion which after extrusion may be sintered to finished molded bodies. In this case, one generally employs 20 to 80, particularly 30 to 70, and particularly preferred 40 to 60 parts by weight of surface-modified powder (either as such or in the form of a dispersion, e.g. prepared as above), 10 to 70, particularly 20 to 60, and particularly preferred 30 to 50 parts by weight of dispersion medium and 0.5 to 20, particularly 2 to 15, particularly preferred 5 to 10 parts by weight of additives selected from binders, plastifiers and mixtures thereof, per 100 parts by weight of composition for extrusion.

The binders and plastifiers mentioned are preferably selected from modified celluloses (e.g. methyl cellulose, ethyl cellulose, propyl cellulose and carboxy-modified cellulose), polyalkylene glycols (particularly polyethylene glycol and polypropylene glycol, preferably having an average molecular weight of from 400 to 50000), dialkylphthalates (e.g. dimethylphthalate, diethylphthalate, dipropylphthalate and dibutylphthalate) and mixtures of said substances. Other binders and plastifiers such as, e.g. polyvinylalcohol etc., may, of course, also be employed.

The above binders and plastifiers are necessary in order to secure a composition capable of being extruded and a sufficient shape stability after the molding operation.

Subsequent to the thorough mixing of the above components (e.g. in a conventional mixer), a part of the dispersion medium may be removed again (preferably in vacuo) until the composition for extrusion shows the desired solids content. Preferred solids contents of the composition for extrusion are around at least 30, and particularly at least 40% by volume.

After the extrusion the extruded molded body may be dried in conventional manner and thereafter further processed to finished sintered bodies. The extruded bodies prepared in the above manner are usually translucent and can be dried without giving rise to cracks.

The method according to the present invention allows the control of the agglomeration of ceramic powders in the nanometer size range which makes it possible to produce dispersions of such particles with high solids contents in a satisfactory manner.

The following examples serve to further illustrate the present invention without, however, limiting same. In said examples, commercially available boehmite powder (Disperal Alumina, manufactured by Messrs. Condea) whose agglomerate size was 83.4% below 25 μm was employed. The size of the primary particles of the powder ranged from 10 to 15 nm.

EXAMPLE 1

Preparation of a Boehmite Powder Surface-Modified by 10% by Weight of Propionic Acid A suspension was prepared from 72.5% by weight of distilled water, 2.5% by weight of propionic acid and 25% by weight of boehmite powder and then said suspension was refluxed with continuous stirring for 16 hours. Thereafter, the suspension was cooled and converted into a powder of surface-modified boehmite particles by means of a lyophilization operation (−20° C., 20 kPa).

EXAMPLE 2

Preparation of a Boehmite Powder Surface-Modified by 5% by Weight of Propionic Acid A suspension was prepared from 73.75% by weight of distilled water, 1.25% by weight of propionic acid and 25.0% by weight of boehmite powder and subsequently said suspension was refluxed with continuous stirring for 16 hours. Thereafter, the suspension was cooled and converted into a powder of surface-modified boehmite particles by a lyophilization operation (−20° C., 20 kPa).

EXAMPLE 3

Preparation of Compositions for Extrusion from Lyophilized Surface-Modified Boehmite Powder For the preparation of structurally viscous, highly concentrated boehmite pastes from lyophilized surface-modified boehmite powder, the following components were employed:

surface-modified boehmite powder (about 6% by weight of propionic acid)

distilled water (30 to 35% by weight)

modified celluloses (2 to 3% by weight)

polyethylene glycols of different molecular weight (2 to 7% by weight )

dialkylphthalates (0 to 2% by weight).

In a specific example, a paste was prepared from 59% by weight of the above surface-modified boehmite powder, 35% by weight of distilled water, 2% by weight of methylcellulose, 2% by weight of polyethylene glycol (average molecular weight<10,000) and 24 by weight of dibutylphthalate. For said purpose, the corresponding additives, after having been dissolved in distilled water heated to 50° C., were added to the boehmite powder in a kneading device preheated to 50° C. Following the evacuation of the mixing chamber (pressure<10 kPa), a highly concentrated, translucent boehmite paste capable of being extruded was obtained after several minutes. Solids contents of above 40% by volume were achieved.

EXAMPLE 4

Preparation of Compositions for Extrusion from Modified Boehmite Suspensions

For the preparation of structurally viscous, highly concentrated boehmite pastes from boehmite suspensions, the following components were employed:

boehmite suspensions (boehmite powder modified by 5 or 10% by weight of propionic acid)

modified celluloses (2 to 3% by weight)

polyethylene glycols of different molecular weights (2 to 7% by weight)

dialkylphthalates (0 to 2% by weight).

In a specific example, a paste was prepared from 91% by weight of the boehmite suspension prepared in example 1 or example 2, 2% by weight of methylcellulose, 3% by weight of poly-ethylene glycol (average molecular weight below 600), 3% by weight of polyethylene glycol (average molecular weight about 6000) and 1% by weight of dibutylphthalate. For said purpose, the corresponding additives were directly added to the boehmite suspension in a kneading device preheated to 50° C. Following the stripping of the excess water by evacuating the mixing chamber (pressure<10 kPa), a highly concentrated boehmite paste capable of being extruded was obtained. Solids contents of above 40% by volume were achieved.

EXAMPLE 5

Extrusion of Highly Concentrated Nanocrystalline Boehmite Pastes

For extruding the boehmite pastes prepared in examples 3 and 4, a piston extruder having a piston diameter of 50 mm was employed. At a temperature of 50° C., tubes having an external diameter of 16 mm and a wall thickness of 2 mm were extruded. The tubes were free of cracks and homogeneous and also highly translucent.

EXAMPLE 6

Drying of Nanocrystalline Boehmite Tubes

The extruded tubes prepared in example 5 were converted into green bodies which were free of cracks and not distorted by lyophilization (20 kPa, −20° C.) within 24 hours. The maximum shrinkage during drying was 5% at a moisture loss of about 25% by weight.

We claim:

1. A method for manufacturing a surface-modified nanometer size ceramic powder, comprising:

modifying the surface of a ceramic powder, by preparing, a suspension comprising
  (i) water or an organic solvent;
  (ii) said ceramic powder; and
  (iii) an organic compound with a molecular weight of not more than 500, having at least one functional group, which interacts or reacts with groups present on the surface of said ceramic powder; and removing wholly said water or said organic solvent from said suspension, thereby forming said surface-modified nanometer size ceramic powder.

2. The method of claim 1, wherein the ceramic powder is selected from the group consisting of metal oxides, mixed metal oxide, carbides, nitrides, borides, carbonitrides and mixtures thereof.

3. The method of claim 1, wherein said ceramic powder comprises boehmite.

4. The method of claim 1, wherein said organic compound has a molecular weight of not more than 350.

5. The method of claim 1, wherein said organic compound is selected from the group consisting of $C_1$–$C_{12}$ monocarboxylic acids, amines of the formula $R_{3-n}NH_n$ with n=0–2 and the radicals R independently represent alkyl groups having 1–12 carbon atoms, β-dicarbonyl compounds having 4–12 carbon atoms, modified alcoholates and organoalkoxysilanes.

6. The method of claim 1, wherein said organic compound is an amine of the formula $R_{3-n}NH_n$, where n=0–2 and the radicals R independently represent alkyl groups having 1–6 carbon atoms.

7. The method of claim 1, wherein said organic compound is a β-dicarbonyl compound having 5–8 carbon atoms.

8. The method of claim 1, wherein said organic compound is a $C_3$–$C_{12}$ monocarboxylic acid.

9. The method according to claim 1, wherein said suspension comprises water.

10. The method of claim 1, wherein said suspension comprises an organic solvent.

11. The method of claim 1, wherein said suspension comprises 40–90% by weight of said water or said organic solvent, based on the total weight of said water or said organic solvent, said ceramic powder and said organic compound.

12. The method of claim 1, wherein said suspension comprises 50–80% by weight of said water or said organic solvent, based on the total weight of said water or organic solvent, said ceramic powder and said organic compound.

13. The method of claim 1, wherein the weight ratio of said ceramic powder:said organic compound ranges from 100:1 to 4:1.

14. The method of claim 1, wherein the weight ratio of said ceramic powder:said organic compound ranges from 50:1 to 8:1.

15. The method of claim 1, wherein said preparing of said suspension is carried out at a temperature of 50°–100° C.

16. The method of claim 1, wherein said removing comprises lyophilizing.

17. A surface-modified ceramic powder obtained by the method of claim 1.

18. A method for manufacturing a surface-modified nanometer size powder comprising:
    lyophilizing a suspension comprising:
    (i) water or an organic solvent;
    (ii) a ceramic powder; and
    (iii) an organic compound with a molecular weight of 500 or less, having at least one functional group which interacts or reacts with groups present on the surface of said ceramic powder,
    wherein said lyophilizing wholly removes said water or said organic solvent from said suspension thereby forming said surface-modified nanometer size powder.

19. The method of claim 18, wherein said lyophilizing comprises removing said water or said organic solvent by simultaneously cooling and reducing pressure.

20. A method for manufacturing a ceramic body comprising:
    preparing a suspension comprising
    (i) water or an organic solvent,
    (ii) a nanometer size ceramic powder, and
    (iii) an organic compound with a molecular weight of 500 or less, having at least one functional group which interacts or reacts with groups present on the surface of said ceramic powder,
    to form a surface-modified ceramic powder; and
    extruding a composition comprising said surface-modified ceramic powder,
    wherein said composition, per 100 parts by weight, comprises:
    20–80 parts by weight of said surface-modified ceramic powder;
    10–70 parts by weight of water or an organic solvent; and
    0.5–20 parts by weight of an additive selected from the group consisting of binders, plastifiers and mixtures thereof.

21. The method of claim 20, wherein said composition, per 100 parts by weight, comprises:
    30–70 parts by weight of said surface-modified ceramic powder;
    20–60 parts by weight of said water or said organic solvent; and
    2–15 parts by weight of an additive selected from the group consisting of binders, plastifiers and mixtures thereof.

22. The method of claim 18, further comprising removing said water or said organic solvent from said suspension.

23. The method of claim 20, wherein said binders and plastifiers are selected from the group consisting of modified celluloses, polyalkyleneglycols, dialkylphthalates and mixtures thereof.

24. The method of claim 20, further comprising removing an amount of said water or said organic solvent from said suspension prior to extruding, thereby forming a composition comprising at least 40% by volume of solids.

25. A method for manufacturing a surface-modified nanometer size ceramic powder, comprising:
    modifying the surface of a ceramic powder by mixing a suspension comprising:
    (i) water or an organic solvent;
    (ii) said ceramic powder; and
    (iii) an organic compound with a molecular weight of not more than 500, having at least one functional group, which interacts or reacts with groups present on the surface of said ceramic powder; and
    removing wholly said water or said organic solvent from said suspension, thereby forming said surface-modified nanometer size ceramic powder.

26. A method for manufacturing a ceramic body comprising:
    mixing a suspension comprising
    (i) water or an organic solvent,
    (ii) a nanometer size ceramic powder, and
    (iii) an organic compound with a molecular weight of 500 or less, having at least one functional group which interacts or reacts with groups present on the surface of said ceramic powder; and
    removing wholly said water or said organic solvent from said suspension, thereby forming a surface-modified nanometer size ceramic powder; and
    extruding a composition comprising said surface-modified nanometer size ceramic powder.

* * * * *